Jan. 5, 1937.  H. W. LORMOR  2,066,691
BATTERY TERMINAL
Filed Feb. 27, 1932
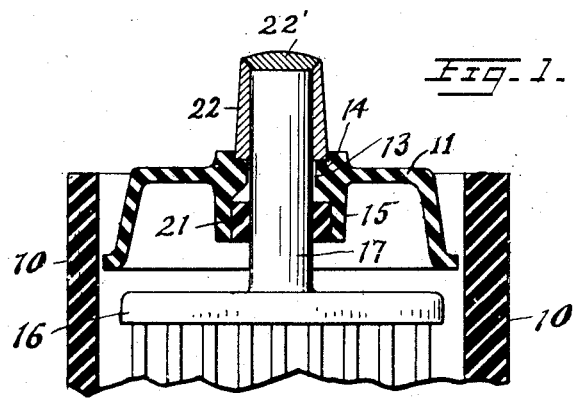
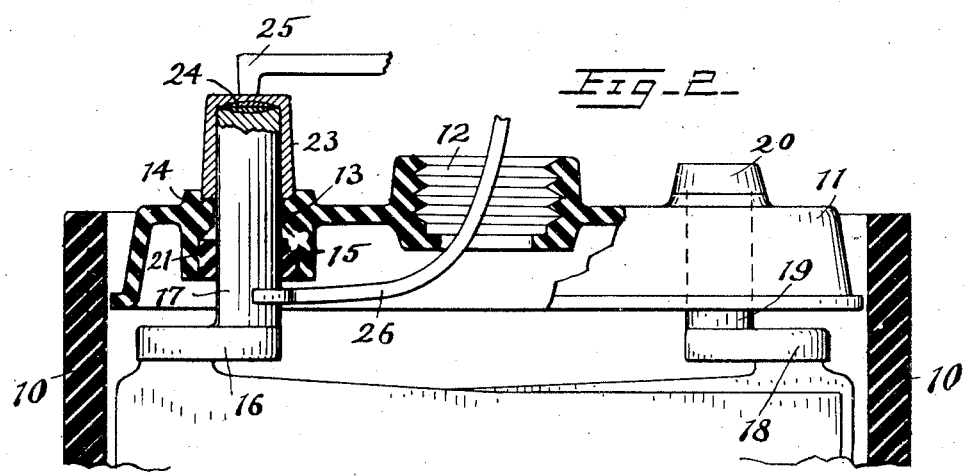
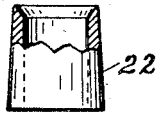 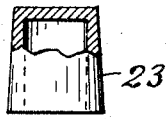
Inventor
HENRY W. LORMOR.
Kwis Hudson & Kent
attys.

Patented Jan. 5, 1937

2,066,691

UNITED STATES PATENT OFFICE 2,066,691

BATTERY TERMINAL

Henry W. Lormor, Cleveland Heights, Ohio, assignor to Willard Storage Battery Company, Cleveland, Ohio, a corporation of West Virginia Application February 27, 1932, Serial No. 595,573

3 Claims. (Cl. 136—168)

This invention relates to improvements in battery terminals and method of making same.

There has been some standardization in size and form of terminal posts for storage batteries intended for use in vehicles. These posts are tapered somewhat toward the top and, if made solid, are of greater cross sectional area than is required to carry the electric current fed from the battery at the maximum rate of discharge. As a consequence they are sometimes made hollow in order to conserve metal, but their manufacture in that form presents difficulties.

One of the objects of the present invention is the provision of a post which shall have in its exposed portion above the battery cover a size and form corresponding precisely with the standards heretofore set up, which shall be solid and therefore adaptable to easy manufacturing methods, and which shall contain a minimum of metal consistent with the proper functioning of the apparatus electrically, thereby reducing costs.

Other objects and features of novelty will appear as I proceed with the description of those embodiments of the invention which, for the purposes of the present application, I have illustrated in the accompanying drawing, in which Figure 1 is a cross sectional view of the upper portion only of a battery cell embodying that form of the invention in which an open thimble or sleeve is employed to complete the upper end of the terminal post.

Fig. 2 is an elevational view partly in longitudinal section of a battery cell embodying that form of the invention in which a closed thimble or cap is used, and showing how welding electrodes may be applied to the work.

Fig. 3 is an elevational view, partly in section, of the open end thimble shown in Fig. 1, and Fig. 4 is a similar view of a closed thimble like that shown in Fig. 2.

In the drawing a battery cell container is shown at 10, it being understood of course that such a cell may be one of several incorporated in a single container or battery jar. The cell cover is indicated at 11, and is of more or less conventional form. It may have a vent opening 12 situated preferably at the central point of the cover, as indicated in Fig. 2.

There is also a terminal post opening 13 in the cover of each end cell of the battery located near one end of the cover, and surrounding this opening I form in the cover a rabbet 14. Depending from the cover around the opening 13 there is an annular projection 15 of somewhat larger internal diameter than the opening 13. Within the cell there are the usual groups of positive and negative plates, the plates of one group having a connecting strap 16 from which a post 17 extends upwardly through the opening 13, while the plates of the other group are connected by a strap 18 from which extends another post 19, sometimes of shorter length than the post 17. From the latter post a conductor bar 20 leads to another similar post in the next cell. In each end cell of the battery there is one terminal post 17 and one post 19, while in the intermediate cell there are two posts 19. Obviously posts 17 could be employed throughout the battery if desired, but in any event they are to be used as the terminal posts to which outside conductors are to be connected. A rubber or other gasket 21 surrounds each of the posts 17 and seals the opening between that post and the annular projection 15 of the cover.

Referring now particularly to Figs. 1 and 3, the part 22 is an open thimble of lead, substantially cylindrical on its inner surface and tapered upwardly on its outer surface to conform with the standardized contour and size of terminal posts used in automobile storage batteries. The thimble has an internal diameter such that it must be forced onto the post 17, and fits the latter tightly. Its length is such that when driven down to the proper position on the post its lower end will enter the rabbet 14 and engage the cover 11. The cover is therefore locked against movement upwardly relative to the battery element.

After the thimble is thus positioned, the workman turns an oxygen acetylene or other flame onto the top of post 17, burning the side walls of the post to the thimble, and thereafter flows additional metal into the cavity above the post 17 and within the projecting rim of the thimble 22, using the flame upon a burning bar for this purpose. In some cases it may be desirable to surround the thimble with a burning form before the burning operation is undertaken. This operation results in the provision of a pill 22' burned onto the top of the post and onto the rim of thimble 22. A good electrical connection as well as a firm mechanical connection is therefore provided between the post 17 and thimble 22.

In the case of the modification illustrated in Figs. 2 and 4 of the drawing, I use a closed thimble 23, which is driven or otherwise forced onto the post 17 to make a tight fit, its lower end extending into the rabbet 14 as in the case of the form of the invention first described. The thimble is then welded to the post 17 in some suitable manner. For this purpose I prefer to form an electric weld 24. One convenient way which I have devised for effecting this weld is illustrated in Fig. 2, where 25 represents one welding electrode and 26 represents the other electrode which is specially formed to extend through the vent opening 12 of the cell cover and to engage the adjacent side of the post 17 between the gasket 21 and the strap 16.

In the foregoing description I have necessarily gone somewhat into detail in order to explain fully the particular embodiments of the invention herein illustrated, but I desire it to be understood that such detail disclosures are not to be construed as amounting to limitations except as they may be included in the appended claims.

Having thus described my invention, I claim:

1. In combination with a battery cover having a circular opening therethrough and having a rabbet in its upper surface surrounding said opening, a terminal post of substantially cylindrical form throughout its length extending through said opening, a tightly fitting thimble consisting of a sleeve having a tapered outer wall and mounted upon the upper end of the post surrounding the entire exposed portion thereof and with the lower end of the sleeve projecting into said rabbet, and means for effecting a good electrical and mechanical union between said post and said thimble.

2. In combination with a battery cover having a circular opening therethrough and having a rabbet in its upper surface surrounding said opening, a terminal post having a substantially cylindrical portion extending through said opening, a tightly fitting thimble consisting of a sleeve closed at its upper end and having a tapered outer wall, said thimble being mounted upon the upper end of the post surrounding the entire exposed portion thereof and with the lower end of the sleeve projecting into said rabbet, and means effecting a good electrical and mechanical union between said post and thimble.

3. In combination with a battery cover having an opening therethrough and having a rabbet in its upper surface surrounding said opening, a terminal post having a substantially cylindrical portion extending through said opening, a tightly fitting thimble consisting of a sleeve open at its upper end and having a tapered outer wall, said thimble being mounted upon the upper end of the post surrounding the entire exposed portion thereof and with the lower end of the sleeve projecting into and concealed by said rabbet, and means closing the upper end of the thimble and effecting a good electrical and mechanical union between said post and thimble.

HENRY W. LORMOR.